(12) United States Patent
Anderson

(10) Patent No.: US 6,923,877 B1
(45) Date of Patent: Aug. 2, 2005

(54) METHOD AND APPARATUS FOR IMPROVING MATERIAL PROPERTIES

(75) Inventor: Raymond I Anderson, Nottingham (GB)

(73) Assignee: Rolls-Royce plc, London (GB)

( * ) Notice: Subject to any disclaimer, the term of this patent is extended or adjusted under 35 U.S.C. 154(b) by 1002 days.

(21) Appl. No.: 09/376,048

(22) Filed: Aug. 17, 1999

(30) Foreign Application Priority Data

Aug. 26, 1998 (GB) ............................................ 9818484

(51) Int. Cl.⁷ ................................................ B01J 19/08
(52) U.S. Cl. ....................... 148/525; 427/457; 427/468; 427/554; 118/620
(58) Field of Search ................................ 427/457, 468, 427/554; 148/525; 118/620

(56) References Cited

U.S. PATENT DOCUMENTS

| | | |
|---|---|---|
| 3,850,698 A | 11/1974 | Mallozzi |
| 4,002,403 A | 1/1977 | Mallozzi |
| 4,060,769 A | 11/1977 | Mallozzi |
| 4,401,477 A | 8/1983 | Clauer |
| 4,428,213 A | 1/1984 | Neal |
| 4,432,220 A | 2/1984 | Loersch |
| 4,888,863 A | 12/1989 | Cox |
| 4,904,528 A | 2/1990 | Gupta |
| 4,937,421 A | 6/1990 | Ortiz |
| 5,075,893 A | 12/1991 | Epstein |
| 5,127,019 A | 6/1992 | Epstein |
| 5,131,957 A | 7/1992 | Epstein |
| 5,222,073 A | 6/1993 | Epstein |
| 5,235,838 A | 8/1993 | Bernstein |
| 5,306,360 A | 4/1994 | Bharti |
| 5,492,447 A | 2/1996 | Mannava |
| 5,522,706 A | 6/1996 | Mannava |
| 5,525,429 A | 6/1996 | Mannava |
| 5,531,570 A | 7/1996 | Mannava |
| 5,554,415 A | 9/1996 | Turchan |
| 5,569,018 A | 10/1996 | Mannava |
| 5,584,586 A | 12/1996 | Casarcia |
| 5,584,662 A | 12/1996 | Mannava |
| 5,591,009 A | 1/1997 | Mannava |
| 5,620,307 A | 4/1997 | Mannava |
| 5,620,754 A | 4/1997 | Turchan |
| 5,635,243 A | 6/1997 | Turchan |
| 5,643,641 A | 7/1997 | Turchan |
| 5,648,127 A | 7/1997 | Turchan |
| 5,671,628 A | 9/1997 | Halila |
| 5,674,328 A | 10/1997 | Mannava |
| 5,675,892 A | 10/1997 | Mannava |
| 5,730,811 A | 3/1998 | Azad |

(Continued)

*Primary Examiner*—Daniel J. Jenkins
(74) *Attorney, Agent, or Firm*—W. Warren Taltavull; Manelli, Denison & Selter PLLC

(57) ABSTRACT

A method and apparatus for improving the properties of a material of a workpiece by laser shock peening in which an overlay which is opaque to a laser beam, and an overlay which is translucent to said laser beam, are applied to a surface of a workpiece. The translucent overlay being applied on top of and over the opaque overlay. A laser beam is then directed at the said surface to which the overlays have been applied to vaporize the opaque overlay and laser shock peen the surface of the workpiece to produce a region of compressive residual stress in said surface. The overlays and the laser beam being applied concurrently, in a single operation, as the surface of the workpiece is traversed so that as each point on the surface to be treated is traversed the opaque overlay, translucent overlay, and laser shock peening are applied sequentially to that point. The opaque overlay is preferably an ink layer which is applied by printing on the surface. The apparatus, which in particular is arranged for carrying out this method, comprises the means for applying the overlays and for directing the laser beam at the surface all mounted upon a common tool head.

18 Claims, 4 Drawing Sheets

U.S. PATENT DOCUMENTS

| | | |
|---|---|---|
| 5,731,046 A | 3/1998 | Mistry |
| 5,735,044 A | 4/1998 | Ferrigno |
| 5,741,559 A | 4/1998 | Dulaney |
| 5,742,028 A | 4/1998 | Mannava |
| 5,744,781 A | 4/1998 | Yeaton |
| 5,756,965 A | 5/1998 | Mannava |
| 5,846,054 A | 12/1998 | Mannava |
| 5,846,057 A | 12/1998 | Ferrigno |
| 6,049,058 A * | 4/2000 | Dulaney et al. ........ 219/121.84 |
| 6,057,003 A * | 5/2000 | Dulaney et al. ............ 427/457 |
| 6,064,035 A * | 5/2000 | Toller et al. ............ 219/121.86 |

* cited by examiner

METHOD AND APPARATUS FOR IMPROVING MATERIAL PROPERTIES

THE FIELD OF THE INVENTION

The present invention relates to methods and apparatus for improving the properties of a metallic material, and in particular to improvements to laser shock peening which imparts compressive residual stresses into the material to improve its material properties.

BACKGROUND OF THE INVENTION

Laser shock peening or laser shock processing, as it is also referred to, is a process for improving the properties of a metallic material from which a workpiece is fabricated. As with any peening process, for example shot peening, it does this by producing a region of deep compressive residual stresses in the material at the surface of a workpiece. The region of such compressive residual stresses in the surface of a workpiece provides a protection layer which beneficially increases the surface material's resistance to surface-related failures such as fatigue, fretting and stress corrosion cracking. A difference, and advantage of, laser shock peening is that this region is considerably deeper than that produced by other peening methods.

The process of laser shock peening involves coating the surface of a workpiece to be treated with a coating that is opaque to a laser to provide an opaque overlay. A transparent overlay, typically a water film, is provided on top of the opaque overlay. A high power pulsed laser beam is then directed onto, and scanned across, the surface of the workpiece. The laser beam passes through the transparent overlay and causes instantaneous ablation or vaporisation of the opaque overlay. The vapour is trapped by the transparent overlay and the explosive force and high pressure shock wave produced is directed into the surface of the workpiece. This results in a localised compressive force on a portion of the surface which produces the beneficial region of deep compressive residual stresses in a surface of a workpiece. Such methods are described in U.S. Pat. No. 3,850,698.

To provide the required degree of compressive residual stress in the surface of the workpiece the above process may be repeated. For example, to provide a suitable protection layer in the surface of workpieces which are to be used in gas turbine engines the process may be repeated up to three times.

The opaque overlay coating is conventionally a black paint that is painted onto the surface of the workpiece and dried. The painted workpiece is then transferred to a separate machine where the transparent overlay is applied and the laser beam is directed at the workpiece.

The painting and drying steps are time consuming and complex. In particular if repeated laser shock peening is required, to produce the desired level of compressive residual stress, then the workpiece has to be repeatedly removed from a laser shock peening machine, painted, dried and then refitted into the machine.

The problems with painting a workpiece within the laser shock peening process are described in U.S. Pat. No. 5,674,329 along with an alternative method. As described in that patent the painting and drying steps are replaced with a less time consuming taping step. The tape which is applied to a workpiece is self adhesive and has an ablative medium which forms the required opaque overlay on the workpiece. Whilst eliminating the time consuming painting and drying steps this method is not ideal. Applying tape to a complex component may in itself be difficult and time consuming and the cost of a the tape may be significant. Furthermore this method described does not address the problem of having to remove the workpiece from the laser shock peening machine in order to reapply the opaque overlay (either paint or tape) during repetition of the laser shock peening process.

SUMMARY OF THE INVENTION

It is therefore desirable to provide an improved and more efficient method and apparatus that addresses the above problems and replaces the complex painting and drying steps with a less time consuming process, and/or offers improvements to such a method and apparatus generally.

According to a first aspect of the present invention there is provided a method improving the properties of a material of a workpiece by laser shock peening in which an overlay which is opaque to a laser beam, and an overlay which is translucent to said laser beam, are applied to a surface of a workpiece, the translucent overlay being applied on top of and over the opaque overlay, a laser beam is then directed at the said surface to which the overlays have been applied to vaporise the opaque overlay and laser shock peen the surface of the workpiece producing a region of compressive residual stress in said surface; wherein the opaque overlay, translucent overlay and the laser shock peening are applied concurrently, in a single operation, as the surface of the workpiece is traversed so that as each point on the surface to be treated is traversed the opaque overlay, translucent overlay, and laser shock peening are applied sequentially to that point.

Applying the opaque overlay, translucent overlay and the laser shock peening concurrently is more efficient than the conventional methods and does not require the workpiece to be removed and installed in different machines. Furthermore the method is also quicker than carrying out these operations separately.

According to a second aspect of the present invention there is provided a method of improving the properties of a material of a workpiece by laser shock peening in which an overlay which is opaque to a laser beam, and an overlay which is translucent to said laser beam, are applied to a surface of a workpiece and a laser beam is then directed at the said surface to which the overlays have been applied to vaporise the opaque overlay and laser shock peen the surface of the workpiece producing a region of compressive residual stress in said surface; wherein the at least one of the overlays is applied by printing an ink layer on the surface of the workpiece.

Using an ink layer as the opaque overlay speeds up the process since an ink dries faster than the conventionally used paints. In addition printing the opaque overlay in the form of an ink layer is also more controllable than the conventional painting methods.

Preferably the opaque overlay is applied by printing an ink layer on the surface of the workpiece. The translucent layer may be applied by printing a translucent ink layer on the surface of the workpiece on top of the opaque overlay.

Preferably the ink layer is printed on the surface of the workpiece by the deposition of a plurality of ink droplets on the surface. Preferably an ink jet printer is used to print the at least one of the overlays on the surface of the workpiece. Alternatively a bubble jet printer may be used to print the at least one of the overlays on the surface of the workpiece.

According to a further aspect of the present invention there is provided apparatus for improving the properties of a material of a workpiece by laser shock peening comprising a means arranged for applying an opaque overlay to a surface of the workpiece, a means arranged for applying a translucent overlay to the surface of the workpiece on top of said opaque overlay, and a means arranged for directing a laser beam at said surface to which the overlays have been applied; wherein said means for applying the overlays and the means for directing a laser beam at the surface are all mounted on a common tool head which is arranged, in use, to move relative to the workpiece over the surface of the workpiece.

Such an apparatus is more integrated than the conventional apparatus and by utilising a common tool head to mount and move the means for applying the opaque and translucent overlays and the means for directing the laser is overall simpler and more efficient than mounting such means separately.

Preferably the means for applying the opaque overlay is a printer. Furthermore the means for applying the opaque overlay is an ink jet printer. Alternatively the means for applying the opaque overlay is a bubble jet printer.

The means for applying the translucent overlay may be a laminar flow fluid nozzle arranged to provide a film of fluid on the surface of the workpiece as the translucent overlay.

The means for applying the translucent overlay may be a printer. Furthermore the means for applying the translucent overlay may be an ink jet printer. Alternatively the means for applying the translucent overlay may be a bubble jet printer.

There may also be provided on the common tool head a means arranged in use for drying the surface of the workpiece prior to applying the opaque overlay. There may also provided on the common tool head a means arranged in use for removing debris and dirt from surface of the workpiece. Preferably there is provided on the common tool head a compressed air nozzle which is arranged in use to direct a stream of compressed air onto the surface of the workpiece prior to applying the overlays.

BRIEF DESCRIPTION OF THE DRAWINGS

The present invention will now be described by way of example with reference to the following figures in which.

DETAILED DESCRIPTION OF THE INVENTION

Laser shock peening is a known process for improving the properties of a workpiece material. The process involves directing and scanning a laser beam over a surface of a workpiece; an opaque overlay and a translucent overlay having previously been applied to the surface of the workpiece that is to be treated. The laser beam passes through the translucent overlay. The opaque overlay however absorbs the energy of the laser beam and rapidly vaporises and expands. The translucent overlay confines the vaporisation of the opaque overlay thereby generating a shock wave which acts upon the surface material of the workpiece. This shock wave provides a local compressive force on the surface material which advantageously generates a deep region of residual compressive stress in the surface material of the workpiece. In the interests of brevity it will be assumed that the skilled man in the art is familiar with the conventional details of this technique and of the conventional apparatus used in this process.

Figure 1:
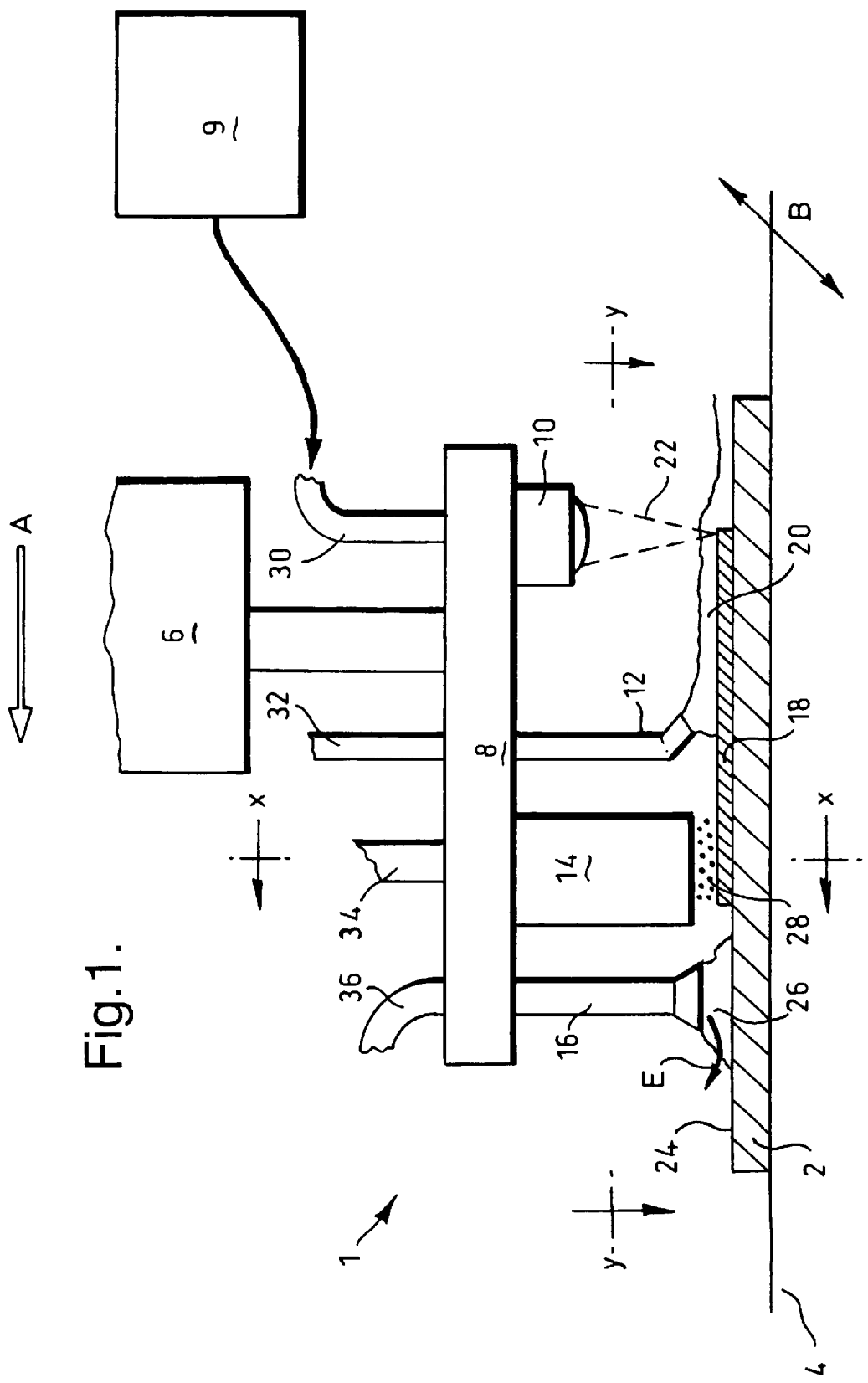
FIG. 1 is a schematic of the laser shock peening apparatus according to an embodiment of the present invention.

Referring to FIG. 1, a workpiece 2 to be laser shock peened is mounted upon a worktable 4 of a conventional CNC (Computer Numerical Controlled) machine (not shown). A laser shock peening tool head 8 is mounted upon the end 6 of a manipulator of the CNC machine (not shown). The CNC machine, under the control of a CNC control system (not shown), provides relative movement of the tool head 8 relative to the worktable 4 and workpiece 2 mounted thereon, as shown by arrows A and B. It will be appreciated that this can be achieved either be by moving the manipulator 6 and tool head 8 over the workpiece 2, or by keeping the manipulator fixed and moving the worktable 4 and workpiece 2 under it. Alternatively the required relative movement can be provided by a combination of moving the manipulator 6 and the work table 4. The distance between the tool head 8 and the surface of the workpiece is also controlled to ensure adequate application of the overlays 18,20 and operation/focusing of the laser beam 22.

A laser head 10, laminar flow water nozzle 12, printer head 14, and an air nozzle 16 are mounted upon the tool head 8. These modules 10,12,14,16 are arranged on the tool head 8 such that, in operation, they can be aligned with the direction of relative movement A, so that as the tool head 8 is moved relative to the workpiece 2 the air nozzle 16, printer head 14, water nozzle 12 and finally laser head 10 are sequentially and concurrently traversed over the surface of the workpiece 2.

Figure 5:
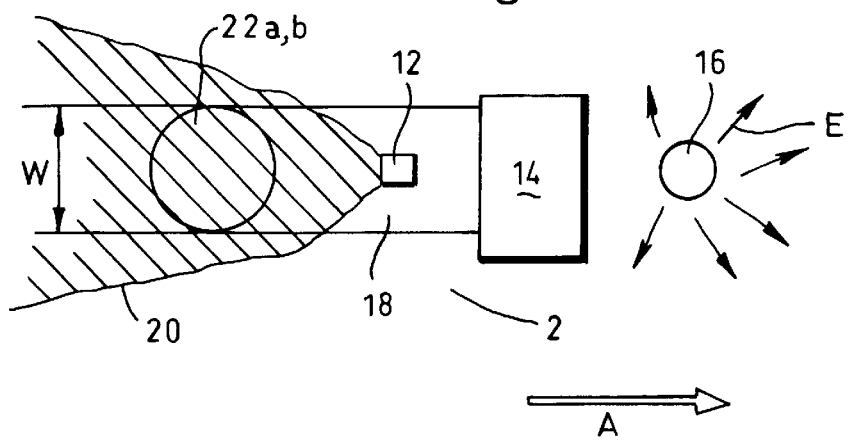
FIG. 5 is schematic sectional view through line Y—Y of FIG. 1.
Figure 4:
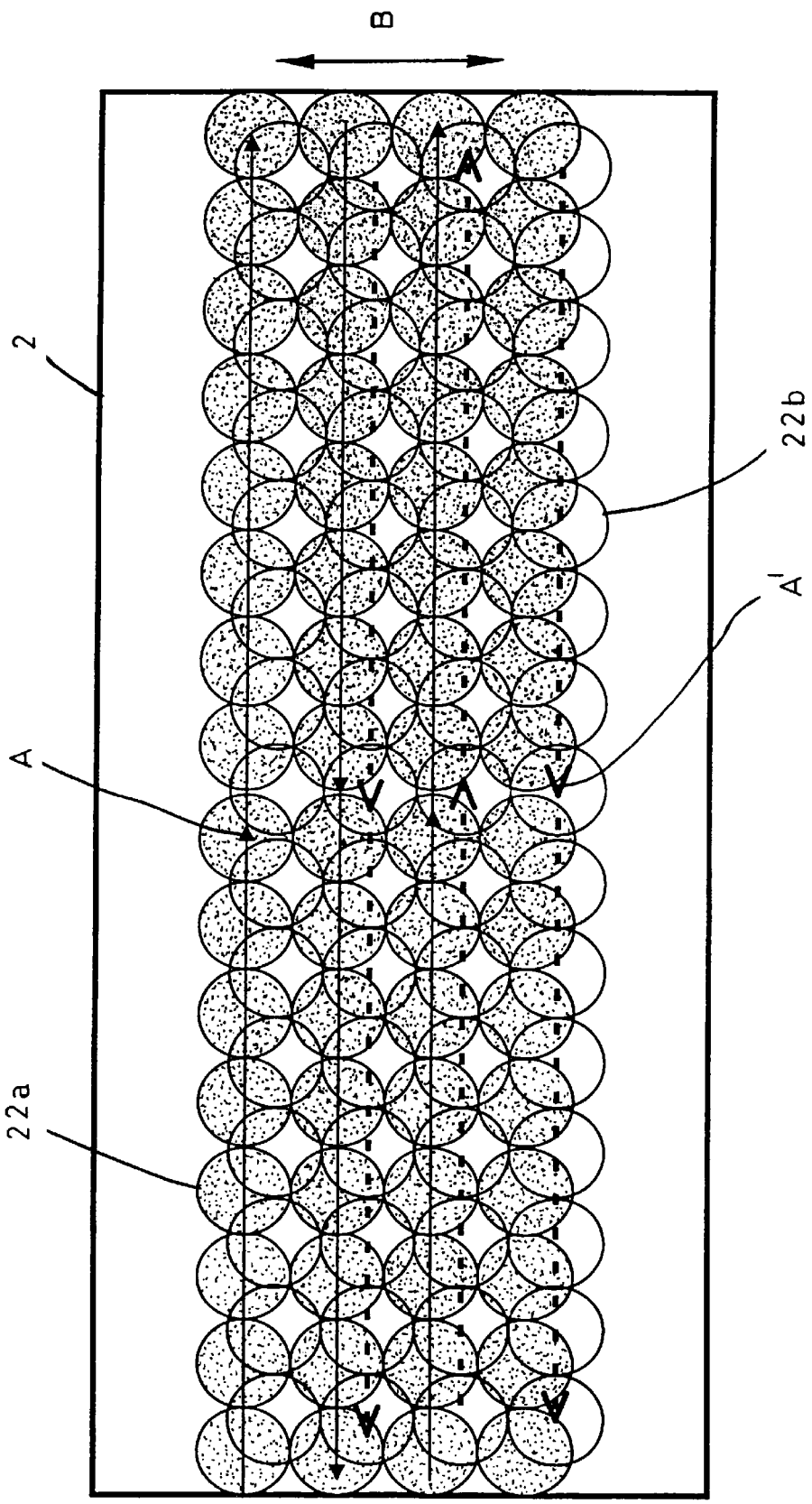
FIG. 4 is a schematic view of the pattern of circular laser shock peening spots.

A laser oscillator 9, for example a high energy pulsed neodymium-glass laser, produces a stream of high energy pulses of laser light, typically of approximately 50 joules or more over a 15 to 30 nanosecond period. This stream of pulsed laser light is directed via a light guide 30 (for example a sequence of mirrors or fibre optic etc.) to the laser head 10. The laser light is focused by the laser head 10 to produce a focused high energy pulsed laser beam 22 that can be directed against the workpiece 2. Each pulse of the laser beam 22 acts on a generally circular area 22a, 22b of the surface 24 of the workpiece 2, as shown in FIGS. 4 and 5. The relative movement A of the tool head 8 and the pulsing of the laser are coordinated to ensure that the respective circular areas 22a where the laser beam 22 is incident on the surface 24 adjoin each other. This ensures that the surface 24 to be laser shock peened is evenly covered and treated by the laser as the tool head 8, and so laser head 10, is scanned, and traversed, over the surface 24 of the workpiece 2 to be treated.

The printer head 14 is arranged to deposit a laminar film of ink, which dries rapidly, to provide the opaque overlay 18 on the surface 24 of the workpiece 2. In this embodiment a conventional commercially available inkjet type of printer head 14 is used, for example a Excel Series 170i Inkjet printer as supplied by Videojet Systems International of Welham Green, Hertfordshire, UK.

Figure 2:
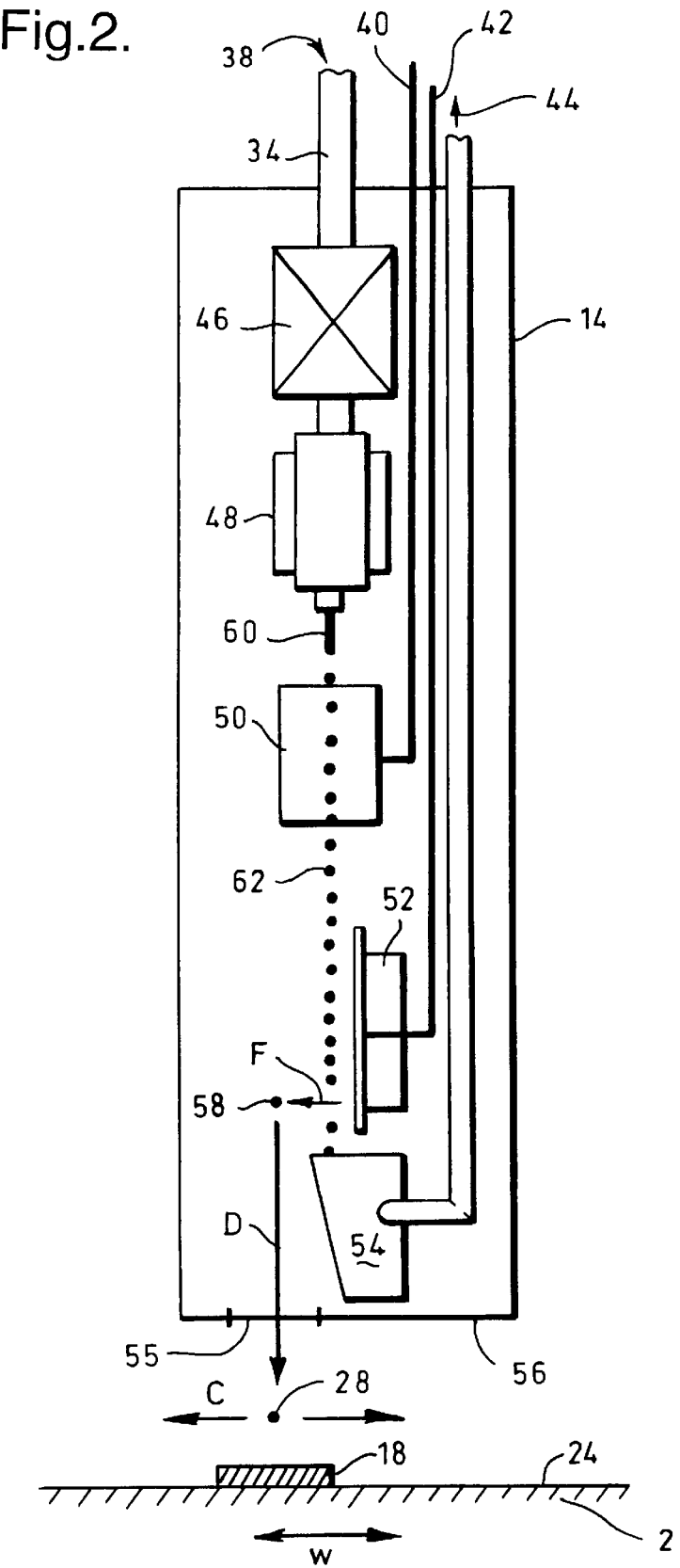
FIG. 2 is a more detailed schematic view though line X—X of a print head of the apparatus of FIG. 1 according to an embodiment of the present invention.

As shown in FIG. 2, the inkjet type of printer head 14 works in a similar way to a cathode tube. A continuous flow of electrically conductive ink 38, typically at a pressure of 50 psi, is supplied from a storage tank and pump (not shown)

to the printer head 14, via a flexible pipe 34. A flow valve 46 controls this flow of ink producing an ink stream 60 that passes through a piezo-electric crystal 48. The crystal 48 oscillates continuously causing the ink stream 60 to break up into a stream of individual ink droplets 62. The precise point where this occurs is controlled such that the break up of the ink stream 60 occurs within a charge tunnel 50. The charge tunnel 50 is supplied, via an electrical connection 40, with a variable high positive voltage signal, at a low current. This produces a region of high electrical charge within the charge tunnel 50. As the ink stream 62 breaks up some of the droplets 62 pick up and retain the high voltage charge produced in the charge tunnel 50. The stream of individual ink droplets 62 then pass a deflection plate 52. A constant positive applied voltage charge is supplied, via an electrical connection 42, to the defection plate 52. Like voltage charges repel each other and so any of the droplets 58 that have retained a charge from the charge tunnel 50 are deflected F away from the deflection plate 52. The majority of the droplets 62 however do not retain any charge and these are simply collected by a vacuum return system 54 that returns the ink droplets 62 via a return line 44, to the ink tank. The deflected droplets 58 though continue, as shown by arrow D, through an outlet aperture 55, out of the end of the printer head 14. The droplets 58 will continue to travel without any further undue deflection for between 10 and 50 mm onto the surface 24 of the workpiece 2 producing a small ink dot on the surface 24. To ensure an acceptable print quality, and so that an adequate opaque overlay 18 is produced it is important to ensure that the printer head 14 is maintained within this distance from the surface 24 of the workpiece. Otherwise uncontrolled deflection of the droplets 58 may produce and uneven ink layer/opaque overlay 18. The controlled deflection F and lateral position of the ink droplets 58 is determined the charge on the droplets 58 supplied by the charge tunnel 50. By varying the charge supplied to the charge tunnel 50 and carefully controlling the relative movement A of the printer head 14 a continuous matrix of overlapping ink dots are deposited onto the workpiece surface 24 to form a laminar film of ink 18 which dries to form the opaque overlay 18.

The ink used is extremely dense, yet volatile and dries rapidly, typically in 0.5 to 1 second. The ink also contains constituents that ensure that, in preferably one pass, the dried ink film is opaque to the laser. The dried ink also readily absorbs the energy of the laser beam 22 and rapidly vaporises, as required. Typically an ink containing a volatile base and including carbon black may be used. The carbon black has good thermal conductivity ensuring good absorption of the energy from the laser beam 22. This provides a suitably opaque ink overlay 18 in a single pass. However other alternative commonly available inks such as for example Black 16-8420 ink available from Videojet Systems International can also be used. This particular ink containing a chromium complex dye, with a Butanone/Ethanol base.

A further alternative ink which would be suitable for use in this process include ink 16-2000 (supplied by Videojet System International of Welham Green, Hertfordshire, UK) which is a polyethanol based ink containing crabon black which dries in less than 10 seconds. A number of MEK (Methyl Ether Ketane) based inks are also suitable. An example of such an ink is 16-5700 ink again supplied by Videojet Systems International which dries in less than 2 seconds.

The opaque ink overlay 18 should adequately cover the surface of the workpiece 2 to ensure that when the laser beam 22 is directed at the surface 24 the energy of the laser beam 22 is absorbed by the opaque layer 18. If this is not the case undesirable melting of the surface 24 may occur. Consequently the printer head 14 is controlled to ensure that an adequate coverage is provided. In addition in further embodiments a means (not shown) for automatically inspecting the opaque ink overlay applied to the surface may be incorporated along with the printer head 14.

Figure 3:
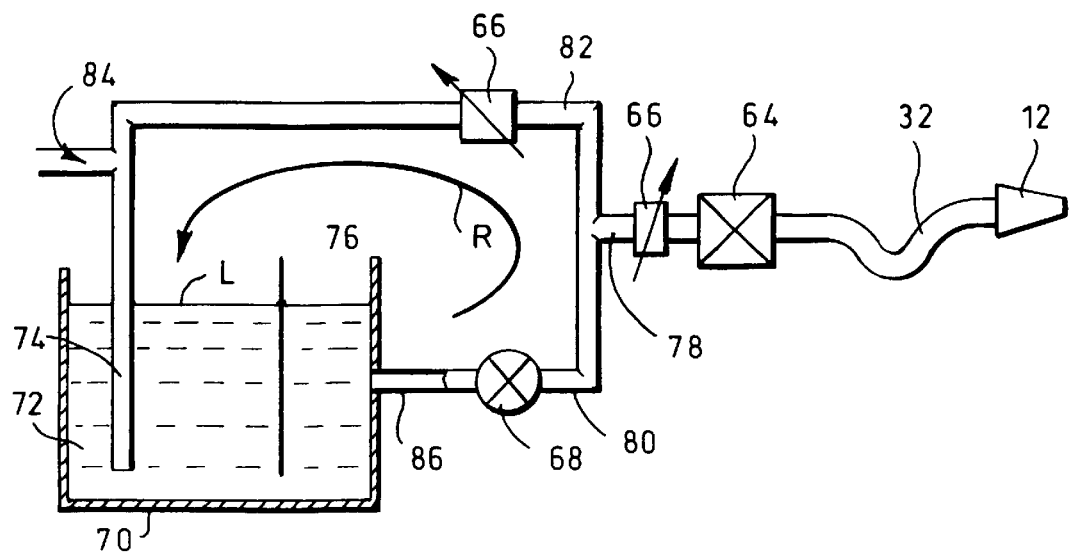
FIG. 3 is a schematic of a water flow system used in conjunction with the apparatus shown in FIG. 1.

The transparent overlay 20 is provided, as is known in the art, by a laminar film of de-aerated de-ionised water. This film 20 is produced on the surface 24 of the workpiece 2, on top of the opaque overlay 18, by the laminar flow water nozzle 12. De-aerated de-ionised water is used since any minerals within normal water may adversely react with the workpiece material during the laser shock peening process. The water supply system to this nozzle 12 is shown in figure 3. A tank 70 stores the de-ionised water used in the process. A small pump drives and pressurises a flow of water from the tank outlet 86 around a recirculation loop 80,82,83 as shown by arrows R. Typically a small centrifugal type pump, of the type generally used to recirculate swimming pool water, is used to provide a virtually pulse free supply of water. The water is returned to the tank 70 via an outlet 74 that is below the water level L in the tank 70 in order to prevent inclusion of air in the water. A baffle plate 76 is also provided within the tank 70 to ensure a smooth flow of water from the outlet 86. Water is supplied to the nozzle 12 via a flexible hose 32 and a control valve 64 from a spur 78 off the recirculation loop 80,82,83. The water supplied to the nozzle 12 is a loss to the recirculatory system. The water is not recycled in order to prevent debris and other dirt from being introduced into, and adversely effecting, the water film 20. Level gauges (not shown) within the tank 70 monitor the water level L and operate a feed connection 84 to replace the water lost.

Using this supply system a constant supply of de-aerated de-ionised water is supplied to the water nozzle 12 producing a steady laminar film 20 of water. In other water supply systems pulses may be generated in the water supplied, in particular if scroll or gear type pumps are used. Such pulses are undesirable since they will affect the laser shock peening by disturbing the laminar film 20 of water, altering its translucency to the laser beam 22 and the confinement of the vapour.

It will be appreciated by those skilled in the art that the translucent overlay 20 can be provided in other ways. For example the translucent overlay 20 can be applied in the form of a translucent tape as described in U.S. patent application 5,676,328. A clear lacquer or other clear film or liquid can also be applied on top of the opaque overlay 18 to provide a translucent overlay. The means for applying these different types of translucent overlays can however be mounted upon the tool head 8 in a similar way to the laminar flow water nozzle 12 used to apply the laminar water film 20. Indeed a translucent ink could be used to provide the translucent overlay 20 with such an ink being applied using a second printer head instead of, and replacing, the water film nozzle 12.

A suitable commercially available translucent ink is 16-2340 Autoclavable invisible ink which again is available from Videojet Systems International of Welham Green, Hertfordshire, UK.

A compressed air nozzle 16 is also mounted upon the tool head 8 ahead and in front of, relative to the direction of relative movement A of the tool head 8, the printer head 14. This directs a stream of compressed air onto the surface 24 of the workpiece 2 as shown by arrow E in FIGS. 4 and 5.

The compressed air blows away and removes any dirt or debris that may be on the surface 24 of the workpiece 2 and also dries the surface 24. This helps ensures that the surface 24 is in a suitable condition for the printer head 14 to print an acceptable opaque ink overlay 18 onto the surface 24. This is particularly beneficial when the laser shock peening operation is being repeated on the same surface 24, as described below. In such a situation there may be, depending on the condition of the surface 24, remnants of the previous opaque overlay 18 on the surface that have to be removed before a subsequent overlay 18 is applied. In addition the surface 24 is likely to be wet, due to the water film applied as the translucent overlay 20 during the previous laser shock peening of the surface 24.

In carrying out the laser shock peening process the workpiece 2 is mounted on the worktable 4 of the CNC machine. The tool head 8 is traversed, relative to the workpiece 2 over the surface 24 regions of the workpiece 2 to be laser shock peened as shown by arrow A. As shown in FIGS. 1 and 5, concurrently as the tool head 8 traverses over a point on the surface 24 of the workpiece 2 the opaque overlay 18 is applied, the translucent overlay 20 applied on top of the opaque overlay 18, and the laser pulsed to vaporise the opaque overlay 18 and laser shock peen that point. The tool head 8 being traversed and scanned in this way over the entire surface 24 of the workpiece 2 to be treated. Since the width W of the opaque overlay 18 is comparable with the size of the laser beam 22 most of the opaque overlay 18, at that point on the surface, is vaporised and removed during the shock peening process.

To provide the required level of improvement in the material of a workpiece 2 it is often necessary for the shock peening process to be repeated, typically up to 3 times. In repeating the process the tool head 8 is again traversed over the surface 24 of the workpiece 2, as shown by arrow A'. However it is advantageous if the tool head 8 follows a different path A' such that the points where the laser is incident 22b on the workpiece and where the shock peening was effected, overlap with those 22a previously used. This is shown by the circles 22b in FIG. 4. This ensures that the surface 24 of the workpiece 2 is more evenly treated. A similar method of overlapping circles where the laser beam 22 is incident on the surface 24 of the workpiece 2 to produce the laser shock peening is shown and described in U.S. Pat. No. 5,674,328.

It will be appreciated though that the pattern of laser shock peening shown in FIG. 4 is an example of only one method of treating the surface 24 of the workpiece 2. Other patterns and methods of carrying out laser shock peening are known in the art. For example in a first pass alternate areas 22a of the surface could be treated in a first pass with the intermediate areas being treated in a further subsequent operation.

Using the above described method it is possible to improve the material surface properties of a metallic workpiece 2. In particular the method can be used to treat components, or sections of components, that are used in gas turbine engines. These components are often used in an extreme operating environment and being subjected to high stresses and operating temperatures. As such improving their material properties, in particular their fatigue and stress corrosion resistance advantageously extends the operational life of such components and/or allows operation at more extreme conditions improving performance of the gas turbine engine.

Concurrently applying the opaque overlay 18, translucent overlay 20, and carrying out the laser shock peening, is faster and more efficient than conventional methods of laser shock peening. Furthermore this method also does not require the workpiece 2 to be removed from the laser shock peening machine, which also improves the speed of the method reduces the chances of handling damage to the workpiece 2. It will be appreciated that the advantages of this aspect of the invention alone may mean that in other embodiments conventional laser shock peening methods can be used to concurrently apply the opaque overlay 18, translucent overlay 20 and carry out laser shock peening. For example the opaque overlay 18 could be applied by concurrently painting or spraying. Both overlays could alternatively be applied in the form of a tape, as described in U.S. Pat. Nos. 5,674,328 and 5,674,329, but applied concurrently to the workpiece surface.

To carry out concurrent laser shock peening the means 14,12 for applying the overlays 18,20 and the laser 10 may in other embodiments be mounted separately within the laser shock peening apparatus, rather than from a common tool head 8. For example each of these means 12,14 and the laser 10 could be mounted on separate manipulators 6 of a CNC machine. However, by using a common tool head 8 upon which the printer head 14, laser head 10, and the water nozzle 12 which applies the translucent overlay 20 are mounted, a convenient and efficient apparatus for concurrently laser shock peening the surface 24 of the workpiece 8 is provided. It also avoids the need to provide separate means for moving the printer head 14, laser head 10 etc. relative to the workpiece 2 thereby reducing the complexity of the apparatus for carrying out the laser shock peening. This is another aspect of the invention. Some of these advantages of using a common tool head 8 mean that in other embodiments of this aspect of the invention a common tool head 8 may be used in a more conventional, non-concurrent method of laser shock peening. In such an embodiment the means 14,12 for applying the opaque 18 and translucent 20 overlays and the laser 10 are all mounted upon a common tool head 8, but are not necessarily all operated at the same time. The opaque and translucent overlays being applied, and the laser shock peeing occurring in at least two separate operations and traverses of the common tool head 8 over the over the entire surface 24 of the workpiece 2 to be treated.

The use of an inkjet printing system to apply the opaque overlay is faster than the conventional method of applying the overlay 18 by painting. In addition such inks applied by the printer head dry faster than conventional paints used in laser shock peening further improving the speed of the process. Furthermore the inkjet system is also more precise and controllable than the conventional painting methods. The opaque overlay 18 is therefore more precisely applied and the thickness of the overlay 18 is better controlled than is sometimes the case with painting the overlay. The control of the thickness of the overlay 18 may important in certain laser shock peening applications since it can have an effect on the degree of laser shock peening and so residual compressive stress produced in the material.

It will be appreciated that other printing systems and methods are known in the art of printing and in other embodiments these other printing, as opposed to painting, systems can be used to apply the opaque overlay 18. For example a bubble jet printing system, in which ink droplets are also fired onto a surface, could be used. The ink droplets being fired onto the surface in a bubble jet system by heating the ink in a number of small compartments in the printer head to form bubbles which expand and are thus ejected from a nozzle.

I claim:

1. A method of improving the properties of a material of a workpiece by laser shock peening in which an overlay which is opaque to a laser beam, and an overlay which is translucent to said laser beam, are applied from a tool head to a surface of a workpiece, the translucent overlay being applied on top of and over the opaque overlay, a laser beam is then directed from said tool head at the said surface to which the overlays have been applied to vaporize the opaque overlay and laser shock peen the surface of the workpiece producing a region of compressive residual stress in said surface; wherein the opaque overlay, translucent overlay and the laser shock peening are applied concurrently, in a single operation by continuous relative movement between the workpiece and said tool head, as the surface of the workpiece is traversed so that as each point on the surface to be treated is traversed the opaque overlay, translucent overlay, and laser shock peening are applied sequentially to that point.

2. A method of improving the properties of a material of a workpiece by laser shock peening in which an overlay which is opaque to a laser beam, and an overlay which is translucent to said laser beam, are applied to a surface of a workpiece and a laser beam is then directed at the said surface to which the overlays have been applied to vaporize the opaque overlay and laser shock peen the surface of the workpiece producing a region of compressive residual stress in said surface; wherein at least one of the overlays is applied by printing an ink layer on the surface of the workpiece, wherein the opaque overlay, translucent overlay and the laser shock peening are applied concurrently, in a single operation by continuous relative movement between the workpiece and a tool head as the surface of the workpiece is traversed so that as each point on the surface to be treated is traversed the opaque overlay, translucent overlay, and laser shock peening are applied sequentially to that point.

3. A method as claimed in claim 2 in which the opaque overlay is applied by printing an ink layer on the surface of the workpiece.

4. A method as claimed in claim 2 in which the translucent overlay is applied by printing a translucent ink layer on the surface of the workpiece on top of the opaque overlay.

5. A method as claimed in claim 2 in which the ink layer is printed on the surface of the workpiece by the deposition of a plurality of ink droplets on the surface.

6. A method as claimed in claim 2 in which an ink jet printer is used to print the at least one of the overlays on the surface of the workpiece.

7. A method as claimed in claim 2 in which a bubble jet printer is used to print the at least one of the overlays on the surface of the workpiece.

8. Apparatus for improving the properties of a material of a workpiece by laser shock peening comprising a means arranged for applying an opaque overlay to a surface of the workpiece, a means arranged for applying a translucent overlay to the surface of the workpiece on top of said opaque overlay, and a means arranged for directing a laser beam at said surface to which the overlays have been applied; said means for applying the overlays and the means for directing a laser beam at the surface being all mounted on a common tool head which is arranged, in use, to move continuously relative to the workpiece over the surface of the workpiece during the applying of said overlays and the directing of the laser beam at said surface with said opaque overlay applying means being first in the direction of movement of the tool head, the translucent overlay applying means being second in the direction of movement of the tool head and the laser beam directing means being third.

9. Apparatus as claimed in claim 8 in which the means for applying the opaque overlay is a printer.

10. Apparatus as claimed in claim 8 in which the means for applying the opaque overlay is an ink jet printer.

11. Apparatus as claimed in claim 8 in which the means for applying the opaque overlay is a bubble jet printer.

12. Apparatus as claimed claims 8 in which the means for applying the translucent overlay is a laminar flow fluid nozzle arranged to provide a film of fluid on the surface of the workpiece as the translucent overlay.

13. Apparatus as claimed in claim 8 in which the means for applying the translucent overlay is a printer.

14. Apparatus as claimed in claim 13 in which the means for applying the translucent overlay is an ink jet printer.

15. Apparatus as claimed in claim 13 in which the means for applying the translucent overlay is a bubble jet printer.

16. Apparatus as claimed in claim 8 in which there is also provided on the common tool head a means arranged in use for drying the surface of the workpiece prior to applying the opaque overlay.

17. Apparatus as claimed in claim 8 in which there is also provided on the common tool head a means arranged in use for removing debris and dirt from surface of the workpiece.

18. Apparatus as claimed in claim 8 in which there is provided on the common tool head a compressed air nozzle which is arranged in use to direct a stream of compressed air onto the surface of the workpiece prior to applying the overlays.

* * * * *